United States Patent [19]

Covert

[11] 4,363,534
[45] Dec. 14, 1982

[54] RETRACTABLE MIRROR AND LOCK THEREFOR

[76] Inventor: Stanley R. Covert, R.R. #3, 4508 Sayles Rd., Ionia, Mich. 48846

[21] Appl. No.: 241,932

[22] Filed: Mar. 9, 1981

Related U.S. Application Data

[63] Continuation-in-part of Ser. No. 82,291, Oct. 5, 1979, Pat. No. 4,286,840.

[51] Int. Cl.³ .............................................. B60R 1/06
[52] U.S. Cl. .................................... 350/289; 350/307
[58] Field of Search ............... 350/289, 307; 248/479, 248/480; 74/535, 577 R, 577 S

[56] References Cited

U.S. PATENT DOCUMENTS

| | | | |
|---|---|---|---|
| 1,031,075 | 7/1912 | Lundin . | |
| 2,419,923 | 4/1947 | Tolbert . | |
| 2,565,012 | 8/1951 | Barrett . | |
| 2,573,443 | 10/1951 | Holland | 350/307 |
| 3,005,383 | 10/1961 | Pierson | 350/307 |
| 3,059,790 | 10/1962 | Augustus | 350/307 |
| 3,107,077 | 10/1963 | Lassa . | |
| 3,322,388 | 5/1967 | Budreck . | |
| 3,612,667 | 10/1971 | Linden | 350/289 |
| 3,625,553 | 12/1971 | Mattioli . | |
| 3,671,005 | 6/1972 | Schultz | 248/480 |
| 3,820,877 | 6/1974 | Moyer | 350/289 |
| 3,937,563 | 2/1976 | Frabe | 350/289 |
| 4,050,776 | 9/1977 | Hsu | 350/289 |
| 4,076,392 | 2/1978 | Suzuki | 350/289 |
| 4,286,840 | 9/1981 | Covert | 350/289 |

FOREIGN PATENT DOCUMENTS

| | | | |
|---|---|---|---|
| 499802 | 1/1939 | United Kingdom | 350/289 |
| 794962 | 5/1958 | United Kingdom | 350/307 |

Primary Examiner—F. L. Evans
Attorney, Agent, or Firm—Price, Heneveld, Huizenga & Cooper

[57] ABSTRACT

The specification discloses a retractable side view mirror comprising an elongate arm adapted to be pivotally mounted on a vehicle for rotation along a substantially horizontal path, and a mirror element attached to the free end of the arm. A mechanically activated pawl is engaged with the arm to positively lock the same in an extended position for rear viewing, and a retracted position for storage, and is disengaged to permit rotation therebetween.

14 Claims, 12 Drawing Figures

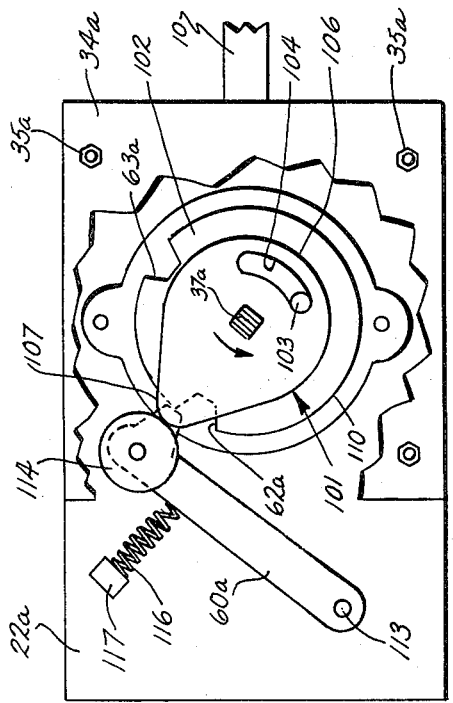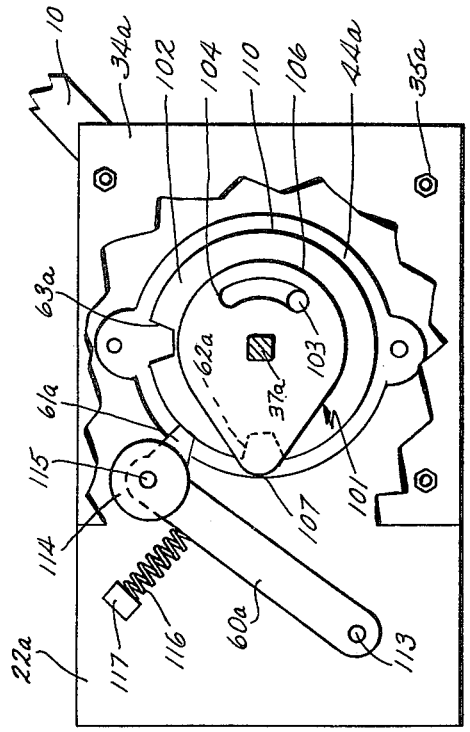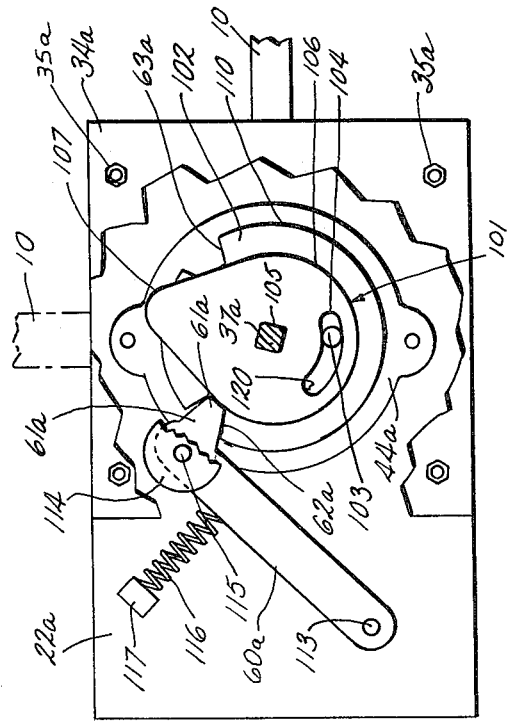

RETRACTABLE MIRROR AND LOCK THEREFOR

CROSS REFERENCE TO RELATED APPLICATIONS

The present application is a continuation-in-part of my co-pending U.S. patent application Ser. No. 82,291, filed Oct. 5, 1979, now U.S. Pat. No. 4,286,840 entitled RETRACTABLE MIRROR.

BACKGROUND OF THE INVENTION

This invention relates to rearview mirrors, and in particular to a retractable side view mirror for vehicles.

Side view mirrors are available for automobiles, trucks, and certain other types of vehicles to permit the driver of the vehicle to observe objects to his rear, such as towed implements, trailing traffic, and the like. When very wide and tall objects are towed behind the vehicle, they often block the line of the sight of the driver through the side view mirror, and thereby render the mirror totally ineffective.

This type of problem is particularly acute in the field of agriculture, because large implements such as grain carts, drawn implements, hay wagons, and the like are commonly towed behind a slow-moving farm tractor. Side view mirrors for such vehicles are preferably adjustable in length so as to extend the mirror outwardly of the implement a distance sufficient to obtain clear vision. Side view mirrors for this purpose are also preferably retractable to permit the tractor and implement to safely pass through narrow paths, such as gate openings, private drives, and the like. Heretofore, such devices were complicated and expensive in construction, inconvenient to operate, and not sufficiently stable to retain the mirror in a steady position. Further, because such devices extend outwardly from the vehicle, they are quite susceptible to being inadvertently hit by an object, such as a fence post, a building, or passing vehicle, thereby causing severe damage to the mirror, and creating a substantial safety hazard.

SUMMARY OF THE INVENTION

The present invention provides a retractable side view mirror for vehicles having a pivotally mounted mirror supporting arm, and a pawl arrangement to positively lock the arm in an extended position for rear viewing, and a retracted position for storage.

Another aspect of the present invention is to provide such a retractable side view mirror, wherein the arm is rotated by an electric motor, and the pawl is manipulated by a cam arrangement attached to the motor, whereby energizing and de-energizing the motor automatically and simultaneously disengages and engages the pawl.

Yet another aspect of the present invention is to provide a retractable side view mirror with a pivotally mounted arm, and a clutch selectively transmitting rotational motion to the arm to alleviate damage to the mirror upon inadvertently striking another object.

Yet another aspect of the present invention is to provide a retractable side view mirror for vehicles, comprising an elongate arm pivotally connected with the vehicle by a bracket, and a motor which mechanically rotates the arm and is remotely activated from a cab portion of the vehicle.

These and many other important advantages of the invention will be further understood and appreciated by those skilled in the art by reference to the following written specification, claims, and appended drawings.

BRIEF DESCRIPTION OF THE DRAWINGS

FIG. 9 is a partially schematic, side elevational view of another embodiment of the present invention, particularly showing a cam operated lock.

FIG. 10 is a top plan view of the cam operated lock of FIG. 9, shown in an engaged position, with portions thereof, broken away to reveal internal construction, and with the extended mirror position shown in full lines, and the retracted mirror position shown in broken lines.

FIG. 11 is a top plan view of the cam operated lock which is similar to FIG. 10, but wherein the pawl is shown in a disengaged position.

FIG. 12 is a top plan view of the cam operated lock which is similar to FIGS. 10 and 11, but wherein the cam is shown in a position intermediate the extended and retracted positions.

DETAILED DESCRIPTION OF THE PREFERRED EMBODIMENTS

Figure 1:
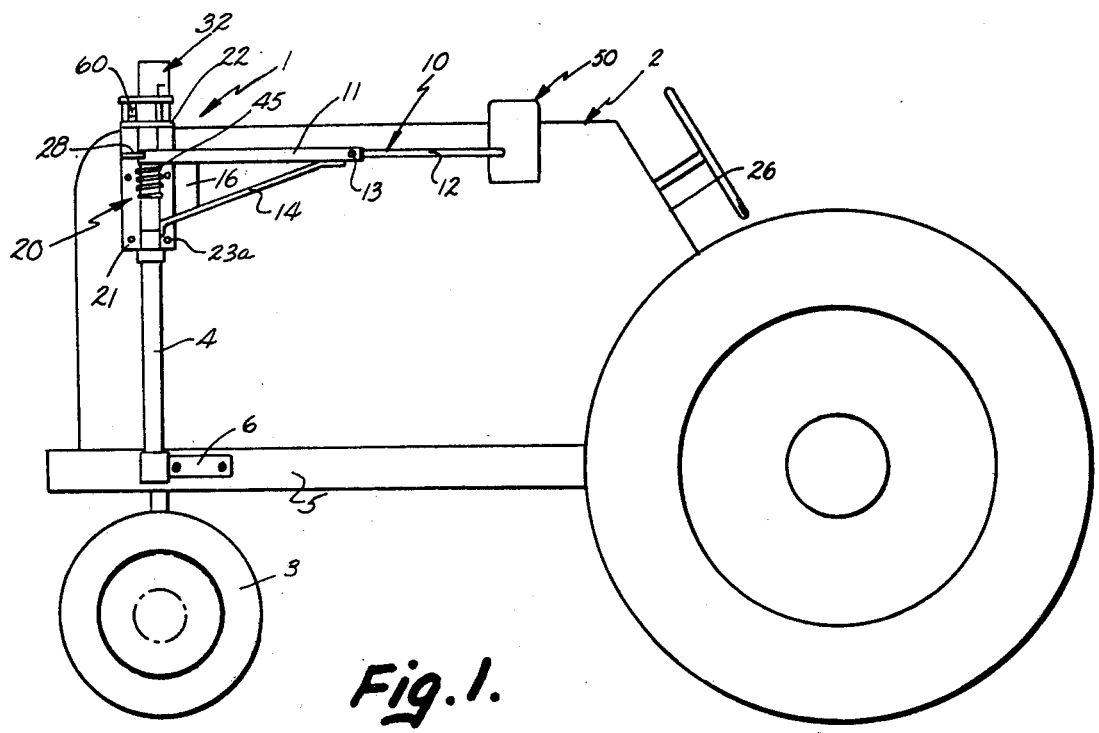
FIG. 1 is a side elevational view of a retractable mirror embodying the present invention, shown connected with a farm tractor, and disposed in a retracted position with respect thereto.
Figure 2:
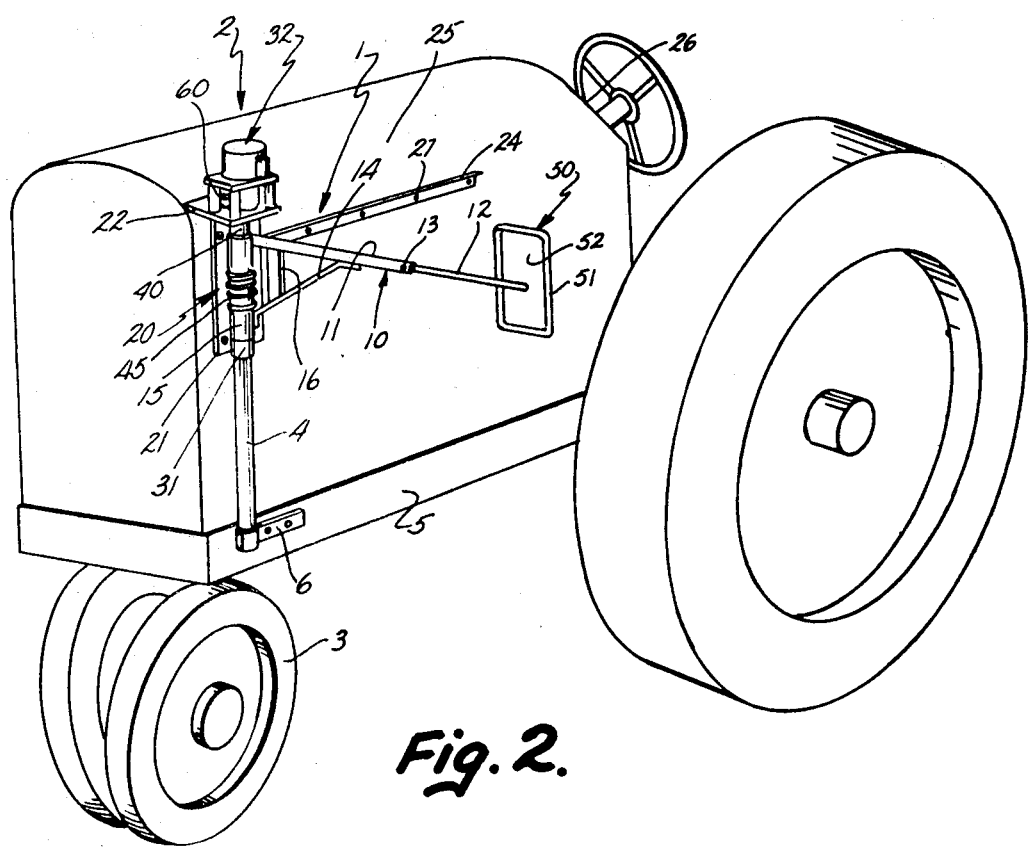
FIG. 2 is a perspective view of the retractable mirror and the tractor, wherein the mirror is shown in an extended position.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations, except where expressly specified to the contrary.

The reference numeral 1 (FIGS. 1 and 2) generally designates a retractable side view mirror embodying the present invention, which is adapted for connection with a vehicle 2. The mirror comprises an elongate arm 10 mounted on the vehicle 2 by a bracket 20 for rotation along a substantially horizontal path or plane, and a mirror element 50 mounted on the free end of arm 10. A mechanically activated pawl 60 is engaged with arm 10 to positively lock the same in an extended position (FIG. 2) for rear viewing, and a retracted position (FIG. 1) for storage, and is disengaged to permit rotation of the arm therebetween.

The mirror 1 may be connected with virtually any type of vehicle 2, and is particularly adapted for connection with an off-the-road type of vehicle, designed to tow wide implements therebehind which tend to block the rear view of the driver. In the illustrated example, the mirror 1 is connected with a farm tractor, and permits the user to pull very wide and high implements behind it, such as farm wagons, grain carts, and the like, without blocking the driver's view. The arm 10 of the mirror is elongate to extend beyond the width of the implement, so as to insure clear rearview vision, and is also retractable to permit the tractor to safely pass through narrow paths, such as gate opening, private drives, and the like.

The illustrated mirror 1 is attached to the farm tractor 2 at a forward portion of the tractor body, in substantial vertical alignment with the axis of rotation of the front tractor wheels 3. A support column 4 is attached to the side frame rail 5 of the tractor, extends vertically therefrom, and is connected with the mirror 1 to securely support the mirror on the tractor in a manner to be described in further detail hereinafter.

Figure 3:
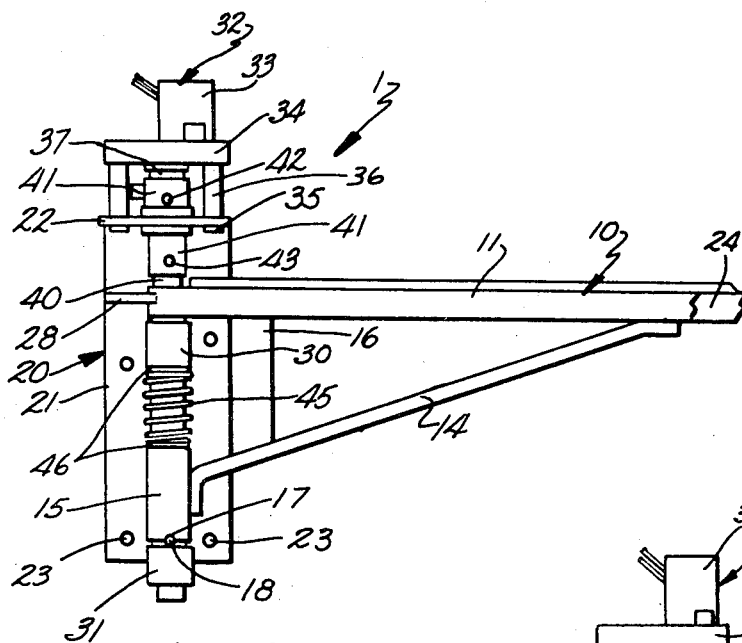
FIG. 3 is a fragmentary front elevational view of the retractable mirror, shown in a retracted position.

With reference to FIGS. 1 and 2, the illustrated arm 10 is an elongate, rigid structure, having two telescoping portions 11 and 12 with a set screw 13 selectively interconnecting the arm portions. The inner end of the arm 11 includes a vertically oriented aperture (not shown) in which a drive shaft portion 40 of the bracket 20 is received (FIG. 3). The arm aperture is sized to permit arm 10 to rotate freely about the drive shaft 40. Arm 10 also includes an angle bracket 14 (FIGS. 3 and 4) which has one end attached to the inner arm 11 at a point spaced apart from the drive shaft 40. The other end of the angle bracket 14 is connected with a cylindrically shaped sleeve 15, aligned axially with the arm aperture, and receives the drive shaft 40 therethrough. A cross brace 16 rigidly interconnects the inner arm 11 and the angle bracket 14 to securely retain the same in the illustrated triangular relationship. The side wall of the sleeve 15 includes a pair of notches 17 on the lower end of sleeve 15 which are aligned and extend diametrically across the sleeve. The notches 17 are substantially semi-circular in shape, and are adapted to mate with the free ends of a pin 18 which extends through the center of the drive shaft 40 and rotates therewith for purposes to be described in greater detail hereinafter.

The mirror 50 (FIG. 2) is rigidly attached to the outer arm 12, and includes a frame 51 having a reflective element 52 securely mounted therein. The reflective element 52 may be either planar or convex, and is adapted to clearly reflect images of objects positioned to the rear of the vehicle.

Figure 4:
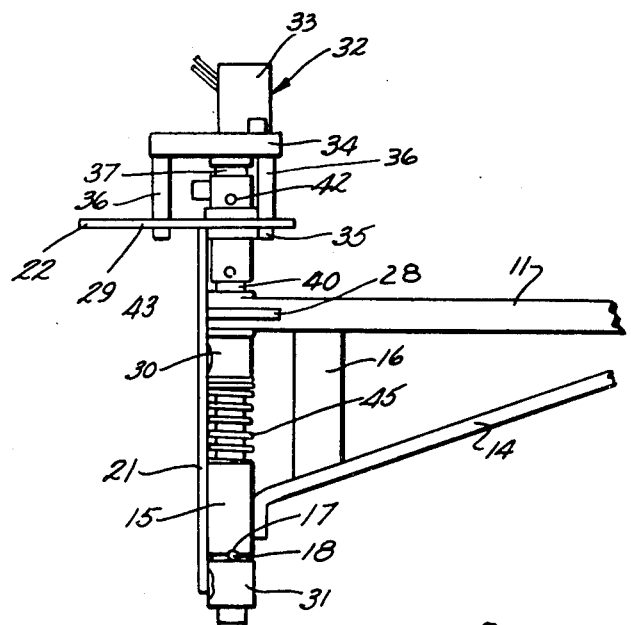
FIG. 4 is a fragmentary side elevational view of the retractable mirror, shown in the extended position.

With reference to FIGS. 3 and 4, the connecting bracket 20 includes vertical and horizontal support plates 21 and 22 respectively, which are fixedly interconnected in a T-shaped configuration. The vertical plate 21 includes a plurality of regularly spaced apertures 23 through which fasteners 23' (FIG. 1) are received and connect the plate to the side of the vehicle 2. An elongate, L-shaped brace 24 has one end fixedly attached to vertical plate 21, and extends parallel therewith along the tractor cowl 25 toward a cab portion 26 of tractor 2. The brace 24 is securely attached to the tractor 2 by fasteners 27 which are spaced along the length of the brace. The vertical plate 21 also includes a triangularly shaped stop 28 (FIG. 3) located on the leading side of plate 21. Stop 28 is positioned in the rotational path of arm 10, and is shaped to abut the same and prevent the arm from rotating past the fully extended arm position. The inside leg 29 of horizontal plate 22 is adapted to rest upon and be connected with tractor cowl 25. Horizontal plate 22 supports a drive assembly 32 thereon which mechanically rotates arm 10 between the extended and retracted positions. The drive assembly 32 includes a conventional, non-step, electric motor 33 connected with a speed reducer 32. The speed reducer 32 is mounted above horizontal plate 22 by fasteners 35 which extend through plate 22, and tubular sleeves 36 are telescopically received over fasteners 35 and act as spacers. The speed reducer 34 includes an output shaft 37 which is oriented downwardly in a substantially perpendicular relationship with the top surface horizontal plate 22. A pair of tubularly shaped sleeves 30 and 31 are fixedly attached to the vertical support plate 21 by means such as welds, and are spaced apart a predetermined distance, and axially aligned to form a bearing in which the drive shaft 40 is rotatably mounted.

The drive shaft 40 is substantially cylindrical in shape, and extends telescopically through the sleeves 30 and 31, and is rotatable therein. Set screw 43 attaches connector 41 with drive shaft 40. Connector 41 extends through an aperture (not shown) in the horizontal support plate 22, and in the illustrated example, a bearing 44 is mounted therein to insure alignment of the assembly. Pin 18 extends through the lower portion of drive shaft 40 at a position slightly above the upper surface of the sleeve 31. Pin 19 extends outwardly of the drive shaft side wall, and is substantially cylindrical in shape.

Figure 7:
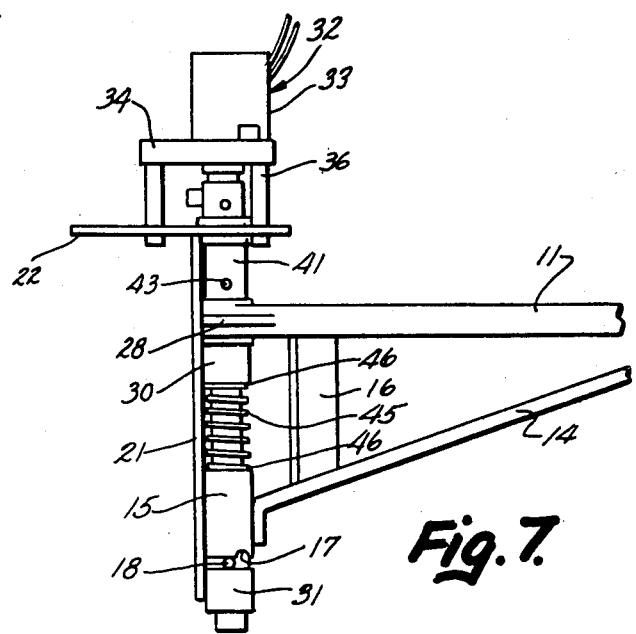
FIG. 7 is a fragmentary side elevational view of the retractable mirror, particularly showing an arm portion thereof disengaged from a clutched drive portion of the mirror.
Figure 8:
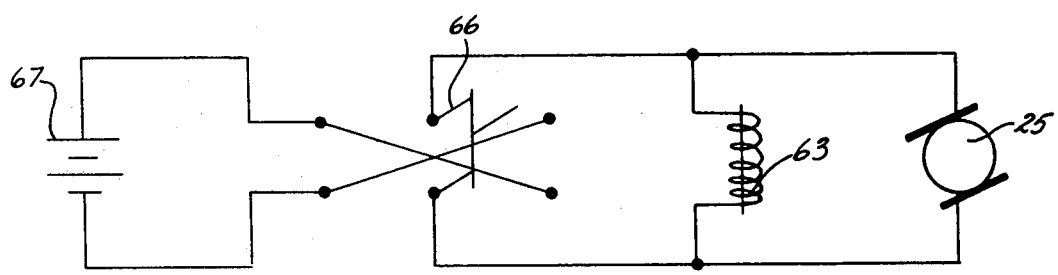
FIG. 8 is a schematic diagram of the electrical interconnection between the various electrical elements of the retractable mirror.

Arm 10 is connected with drive shaft 40 by positioning the arm aperture and sleeve 15 in alignment with sleeves 30 and 31. A coil spring 45 with washers 46 at each end thereof is positioned between the lower end of the sleeve 30 and the upper end of sleeve 15 and is tensed or compressed to enable the same to fit therebetween. Coil spring 45 is positioned coaxially with the sleeves 30 and 31, and drive shaft 40 is inserted upwardly through the sleeves 30, 15, and 31, as well as the spring 45 and washers 46. Spring 45 resiliently urges arm 10 downwardly, whereby the sleeve 15 is retained in abutting engagement against pin 18. Arm 10 is normally positioned in a relationship such that the sleeve notch 17 matingly engages the pin 18, whereby rotation of the drive shaft 40 imparts rotation to the arm 10. However, if an external torque is applied to the arm, such as by inadvertently hitting another object, the pin and notch clutch arrangement permits arm 10 to rotate independently of and with respect to drive shaft 40, as shown in FIG. 7, to prevent severe damage to the mirror assembly as described in greater detail hereinafter. When arm 10 is mounted on drive shaft 40, the inner arm 11 is spaced vertically apart from both sleeve 30 and connector 41, so that the arm can reciprocate along the drive shaft. Stop 28 is disposed directly in the rotational path of arm 10, and abuts the same to prevent the arm from rotating past the fully extended position. When arm 10 is fully retracted, it fits under the upper web of brace 24 and overlies the other brace web.

In the embodiment illustrated in FIGS. 1-8, the upper end of drive shaft 40 (FIGS. 3 and 4) is attached directly to output shaft 37 of speed reducer 34 by connector 41. The lower end of output shaft 37 is telescopically received into the upper end of connector 41, and is anchored therein by set screw 42. Rotation of output shaft 37 by activation of motor 33 is transmitted directly to and rotates connector 41 and drive shaft 40.

Figure 5:
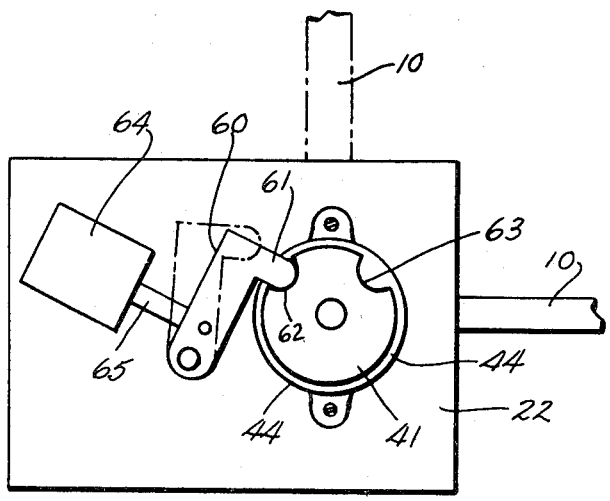
FIG. 5 is an enlarged, partially schematic view of a pawl element of the retractable mirror, with the extended mirror position shown in full lines, and the retracted mirror position shown in broken lines.
Figure 6:
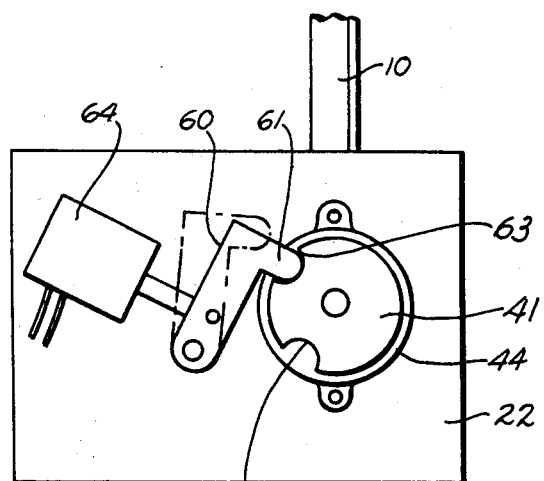
FIG. 6 is another view of the pawl arrangement, shown in the retracted mirror position.

As best illustrated in FIGS. 5 and 6, pawl 60 is pivotally mounted at one end to the upper surface of horizontal support plate 22, and includes a free end 61 which is shaped to matingly engage one of at least two similarly shaped notches 62 and 63 formed in the side wall of the upper portion of connector 41. The notches 62 and 63 are positioned approximately 90 degrees apart, and in the orientation illustrated in FIGS. 5 and 6, pawl engagement in notch 62 corresponds to the extended arm position, and pawl engagement with notch 63 corresponds with the retracted arm position. Means are provided to pivot pawl 60 between engaged and disengaged positions with respect to connector 41. When the free end 61 of pawl 60 is received in one of the mating connector notches 62 and 63, arm 10 is positively locked in the corresponding extended or retracted position.

In the embodiment illustrated in FIGS. 1–8, pawl 60 is pivoted in and out of engagement with connector 41 by a solenoid 64. Solenoid 64 is rotatably connected with a medial portion of the pawl 50, whereby extension of the solenoid shaft 65 pivots free end 61 of the pawl inwardly into engagement with one of the notches 62 and 63, and retraction of shaft 65 withdraws the pawl. Solenoid 64 preferably includes a spring which resiliently urges shaft 65 outwardly when the solenoid is de-energized, such that the pawl is normally engaged with the arm. The solenoid 64 is preferably activated by a switch (shown schematically at 66 in FIG. 8) mounted in the vehicle cab 26 within the reach of the driver As diagrammatically shown in FIG. 8, solenoid 63 and electric motor 32 are electrically connected in a parallel relation, whereby energizing motor 32 through the switch 66 automatically and simultaneously activates the solenoid 63 and disengages the pawl 60 from the arm 10 to permit the arm to rotate under the power of the motor. Motor 32 and solenoid 63 are selectively energized by a power source 67, such as the vehicle battery.

The reference numeral 1a generally designates another embodiment of the present invention, which is illustrated in FIGS. 9–12, and includes a mechanical cam arrangement 100 for engaging and disengaging pawl 60a. Since retractable mirror 1a is similar to the previously described arrangement 1, similar parts appearing in FIGS. 1–8 and 9–12 respectively are represented by the same, corresponding reference numeral, except for the suffix "a" in the numerals of the latter.

With reference to FIGS. 9–12, the lower end of speed reducer output shaft 37a has an ovate cam 101 fixedly attached to the shaft and rotates therewith. A lock plate 102 is attached to the upper end of drive shaft 40a, and is disposed directly beneath and vertically in line with cam 101. A drive pin 103 and mating elongate, arcuate slot 104 disposed in cam 101 and lock plate 102 provides a means for selectively transmitting rotation from output shaft 37a to arm 10, whereby activation of motor 32a automatically and sequentially unlocks arm 10, and then rotates the arm to either the extended or the retracted position.

In the structure illustrated in FIGS. 9–12, cam 101 includes a square aperture 105, in which the lower end of output shaft 37a is matingly received. The square aperture and shaft shoulder act as a key to insure simultaneous rotation of output shaft 37a and cam 101. Cam 101 has a generally arcuate, oblong shape in plan view (FIGS. 10–12), with a circular pattern portion 106 concentric with output shaft 37a, and a lobe portion 107 projecting outwardly therefrom. Slot 104 is disposed in the larger end of cam 101, and includes an arcuate longitudinal axis, which is concentric with drive shaft 37a. On this example, slot 104 is symmetrical about the longitudinal axis of cam 103.

Lock plate 102 is rigidly attached to the upper end of drive shaft 40a, and is generally disk shaped with detents 62a and 63a positioned along its circumferential edge 110. In this example, detents 62a and 63a are positioned approximately 90 degrees apart, and have a plan shape in the nature of a truncated "V" or trapazoid, which mates the free end 61a of pawl 60a. Lock plate 102 is disposed directly beneath cam 101, concentric with output shaft 37a. Lock plate 102 and shaft 40a are rotatably mounted in lower plate 22a by suitable means, such as a bearing 44a. Drive pin 103 has its lower end anchored in lock plate 102 at a location eccentric to the central axis of shafts 37a and 40a. Drive pin 103 extends upwardly and substantially perpendicularly from the upper surface of lock plate 102, and is concentric with and extends into the arcuate slot 104 in cam 101. The diameter of drive pin 103 is slightly less than the width of slot 104 so that the pin can translate freely therein.

Pawl 61a is pivotly mounted to plate 22a at one end thereof by a pin 113, or other suitable fastening means. A roller 114 is rotatably mounted on the other end of pawl 60a by a pin 115, and is adapted to abut the marginal surface of cam 101, and function as a cam follower. A coil spring 116 has one end fixedly mounted in an anchor block 117, and its other end connected with pawl 60a at a location adjacent to the free end of the pawl. Coil spring 116 is pretensed so as to resiliently urge the free end 61a of pawl 60a against the peripheral edge 110 of lock plate 102, and into detent 63a.

In operation, the mirror lock illustrated in FIGS. 9–12 functions in the following manner. To change the position of mirror arm 10, the operator simply activates motor 32a by closing a switch in the cab of the vehicle. The speed reducer 43a is thereby manipulated, rotating output shaft 37a in the direction desired, and cam 101 rotates on output shaft 37a. The lobe portion 107 of cam 101 abuts roller 114, and pivots the free end of pawl 60a, against the force of spring 116, away from lock plate 102 until pawl end 61a is completely withdrawn from notch 63a.

As illustrated in FIG. 10, the rotation of output shaft 37a and/or cam 101 is not immediately transmitted to drive shaft 40a or arm 10. Rather, lock plate 102 remains stationary until pawl 60a is completely withdrawn from detent 62a or 63a, and the arm is thereby unlocked. Hence, at the beginning of the operational cycle, the slot 104 in cam 101 rotates with respect to drive pin 103. The length of slot 104 is selected so that the lobe 107 of cam 101 completely withdraws pawl 68 from detent 62a or 63a in lock plate 102 before the end 120 of slot 104 engages drive pin 103. As best illustrated in FIG. 11, after cam 101 has withdrawn pawl 60a from lock plate 102, the end 120 of slot 104 engages drive pin 103 and rotates lock plate 102 and drive shaft 40a. Once the detent 62a in which pawl 60a was previously engaged has passed underneath the outer end 61a of the pawl, the lobe portion 107 of the cam passes over roller 114, and sets the pawl down against the peripheral edge 110 of lock plate 102. The resilience of compressed coil spring 116 constantly urges pawl 60a into engagement with the upcoming detent 63a. In this example, drive shaft 40a is rotated a full 90 degrees until pawl 60a is received in the trailing detent 63a, so as to positively lock arm 10 in position. Motor 32a is then de-energized. Means, such as a switch (not shown) located on pawl 60a may be provided to automatically switch the motor off when arm 10 reaches either the fully extended or fully retracted position.

To rotate arm 10 to the opposite position, the operator simply re-energizes motor 32a in a manner which causes it to rotate in the opposite direction. Cam 101 rotates with motor 32a until pawl 60a has been withdrawn from its mating detent 62a or 63a, and engagement between drive pin 103 and mating slot 104 will then rotate the arm to the opposite direction and re-engage the lock.

In use, the mirror 1 is connected at a convenient location to the vehicle forward of the driver's line of sight. For additional rigidity, the support column 4 is connected with the frame rail 5 of the vehicle by bracket 6. The upper end of the column receives the lower end of the drive shaft 40 therein, and abuts with the sleeve 31, thereby providing vertical support for the mirror. The outer arm member 10 is then adjusted in accordance with the width of the trailed implement and locked in place with set screw 13, such that the driver can see alongside of the implement. The arm 10 is normally retained in the extended position (FIG. 2) for rear view by the pawl 60 engaged in the first notch 62. Should the mirror and/or arm 10 inadvertently hit an object, such as a fence post, building, or the like, the arm will rotate with respect to the drive shaft, as shown in FIG. 7, and thereby avoid serious damage to the mirror assembly. When such an external torque is applied to the arm 10, the force applied to the pin 18 by the sleeve 13 lifts the sleeve 13 as a result of the cylindrical pin and notch shape, and compresses the spring 17 to disengage the pin 16 from the mating notch 14. The arm 10 may be re-engaged with the drive shaft 32 by simply rotating the arm to the fully extended position which the arm originally assumed, wherein the sleeve notch 14 is re-engaged with the pin 16 in a snap fashion.

To retract arm 10 in the embodiment illustrated in FIGS. 1-8, the user manipulates switch 66, thereby simultaneously energizing the motor 25 and the solenoid 63. The solenoid 63 withdraws the pawl 50 from the notch 62, thereby permitting the motor 32 to rotate the arm rearwardly into the folded or retracted position. When the arm has reached the fully retracted position, the motor 32 is de-energized, whereby the solenoid is simultaneously deactivated and the solenoid spring extends the pawl 60 and engages the same into the notch 63 to lock the arm 10 in the retracted position.

In the foregoing description, it will be readily appreciated by those skilled in the art that many modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A retractable side view mirror for vehicles, comprising:
   mirror means for reflecting an image therein;
   an elongate arm having said mirror means mounted on one end thereof;
   bracket means adapted for connection with said vehicle, and having the other end of said arm pivotally mounted therein for rotation along a substantially horizontal path; said arm having an extended position for rear view by a driver of the vehicle, and a retracted position for folding said arm and mirror inwardly toward the body of the vehicle;
   means for selectively rotating said arm between said extended and retracted positions;
   a pawl mounted on said bracket means, shaped for selective reception in a detent disposed in the other end of said arm, and including means for moving said pawl into said detect to positively lock said arm in at least one of said extended and retracted positions, and out of said detent to permit arm rotation therebetween; said pawl moving means comprising:
   a motor mounted on said bracket means, and having an output shaft;
   a cam connected with the output shaft of said motor and rotating therewith; said cam having a lobe positioned adjacent said pawl, whereby activation of said motor rotates said cam into engagement with said pawl, and automatically unlocks said arm by lifting said pawl out of said arm detent.

2. A retractable side view mirror as set forth in claim 1, wherein:
   said arm rotating means comprises means for selectively transmitting rotation from said motor output shaft to said arm, whereby activation of said motor automatically and sequentially unlocks said arm and then rotates said arm to one of said extended and retracted positions.

3. A retractable side view mirror as set forth in claim 2, including:
   a lock plate connected with the other end of said arm, rotating therewith and disposed directly below said cam; and
   one of said cam and said lock plate having a drive pin eccentric to said motor output shaft and extending therefrom into an elongate, arcuate aperture in the other of said cam and lock plate; said aperture having a preselected length, whereby rotation of said motor drive shaft pivots said cam into a position wherein said pawl is fully withdrawn from said detent before said drive pin engages an end of said aperture to rotate said arm.

4. A retractable side view mirror as set forth in claim 3 wherein:
   said lock plate includes a marginal edge in which said detent is disposed.

5. A retractable side view mirror as set forth in claim 4, wherein:
   said lock plate marginal edge includes a second detent, spaced from said first named detent at a position to selectively lock said arm in the other of said extended and retracted positions.

6. A retractable side view mirror as set forth in claim 5, including:
   resilient means for normally urging said pawl into engagement with said lock plate marginal edge.

7. A retractable side view mirror as set forth in claim 6, wherein:
   said pawl includes a roller rotatably mounted thereon for abutting engagement with said cam.

8. A retractable side view mirror as set forth in claim 1, including:
   a lock plate connected with the other end of said arm, rotating therewith and disposed directly below said cam; and
   said lock plate including a marginal edge in which said detent is disposed.

9. A retractable side view mirror as set forth in claim 1, including:
resilient means for normally urging said pawl into engagement with said arm other end.

10. A retractable side view mirror as set forth in claim 1, wherein:
said pawl includes a roller rotatably mounted thereon for abutting engagement with said cam.

11. A retractable side view mirror for vehicles, comprising:
mirror means for reflecting an image therein;
an elongate arm having said mirror means mounted on one end thereof;
bracket means adapted for connection with said vehicle, and having the other end of said arm pivotally mounted therein for rotation along a substantially horizontal path; said arm having an extended position for rear view by a driver of the vehicle, and a retracted position for folding said arm and mirror inwardly toward the body of the vehicle;
a motor selectively rotating said arm between said extended and retracted positions; said motor having an output shaft;
a pawl mounted on said bracket means, shaped for selective reception in a detent disposed in the other end of said arm, and including means for moving said pawl into said detent to positively lock said arm in at least one of said extended and retracted positions, and out of said detent to permit arm rotation therebetween; said pawl moving means comprising:
a cam connected with the output shaft of said motor and rotating therewith; said cam having a lobe positioned adjacent said pawl, whereby activation of said motor rotates said cam into engagement with said pawl, and thereby unlocks said arm by lifting said pawl out of said arm detent; and
means for selectively transmitting rotation from said motor output shaft to said arm, whereby activation of said motor automatically and sequentially unlocks said arm, and then rotates said arm to one of said extended and retracted positions.

12. A lock for retractable side view mirrors of the type comprising mirror means for reflecting an image therein;
an elongate arm having said mirror means mounted on one end thereof; bracket means adapted for connection with a vehicle, and having the other end of said arm pivotally mounted therein for rotation along a substantially horizontal path; said arm having an extended position for rear view by a driver of the vehicle, and a retracted position for folding said arm and mirror inwardly toward the body of the vehicle; and means for selectively rotating said arm between said extended and retracted positions; said lock comprising:
a pawl shaped for mounting on said bracket means, and being selectively received in a detent disposed in the other end of said arm;
means for moving said pawl into said detent to positively lock said arm in at least one of said extended and retracted positions, and out of said detent to permit arm rotation therebetween; said pawl moving means comprising:
a motor adapted for mounting on said bracket means, and having an output shaft;
a cam connected with the output shaft of said motor and rotating therewith; said cam having a lobe positioned adjacent said pawl, whereby activation of said motor rotates said cam into engagement with said pawl, and automatically unlocks said arm by lifting said pawl out of said arm detent.

13. A retractable side view mirror locks as set forth in claim 12, wherein:
said arm rotating means comprising means for selectively transmitting rotation from said motor output shaft to said arm, whereby activation of said motor automatically and sequentially unlocks said arm and then rotates said arm to one of said extended and retracted positions.

14. A retractable side view mirror lock as set forth in claim 13, including:
a lock plate connected with the other end of said arm, rotating therewith and disposed directly below said cam; and
one of said cam and said lock plate having a drive pin eccentric to said motor output shaft and extending therefrom into an elongate, arcuate aperture in the other of said cam and lock plate; said aperture having a preselected length, whereby rotation of said motor drive shaft pivots said cam into a position whereby said pawl is fully withdrawn from said detent before said drive pin engages an end of said aperture to rotate said arm.

* * * * *

UNITED STATES PATENT AND TRADEMARK OFFICE
CERTIFICATE OF CORRECTION

PATENT NO. : 4,363,534
DATED : December 14, 1982
INVENTOR(S) : Stanley R. Covert It is certified that error appears in the above-identified patent and that said Letters Patent is hereby corrected as shown below:

Column 10, Claim 13 [20], Line 27:

"locks" should be --lock--

Column 10, Claim 14 [21], Line 44:

"whereby" should be --wherein--

Signed and Sealed this

Twenty-second Day of March 1983

[SEAL]

Attest:

GERALD J. MOSSINGHOFF

Attesting Officer

Commissioner of Patents and Trademarks